United States Patent [19]
Nilsson

[11] Patent Number: 5,511,337
[45] Date of Patent: Apr. 30, 1996

[54] ACTIVE FISHING LINE BRAKE

[76] Inventor: Benkt-Olov Nilsson, Linnarhultsvägen 9a, 424 55 Angered, Sweden

[21] Appl. No.: 303,615

[22] Filed: Sep. 9, 1994

[51] Int. Cl.[6] .................................................. A01K 87/00
[52] U.S. Cl. ................................................................ 43/25
[58] Field of Search ............................................ 43/25, 24

[56] References Cited

U.S. PATENT DOCUMENTS

| | | | |
|---|---|---|---|
| 1,709,436 | 4/1929 | Koester | 43/25 |
| 2,303,645 | 12/1942 | Lacy | 43/25 |
| 2,464,880 | 3/1949 | McCombs | 43/25 |
| 2,791,858 | 5/1957 | Kernodle | 43/25 |
| 3,045,380 | 7/1962 | Meredith | 43/25 |
| 3,053,004 | 9/1962 | Baker | 43/25 |
| 3,533,181 | 10/1970 | Kniskern | 43/25 |

*Primary Examiner*—Kurt Rowan
*Assistant Examiner*—Allyson Abrams
*Attorney, Agent, or Firm*—Jeffrey Slusher

[57] ABSTRACT

A fishing line brake is mounted as a single unit on a rod and includes a main body and a pair of clamping arms that are rotatable relative to the main body. At least one guide ring is securely attached to at least one of the clamping arms. An actuation arrangement switches the line brake between a free-running configuration, in which the fishing line extends without contact through each guide ring, and a locking configuration, in which the lime is clamped between the clamping arms. At least one spring biases the brake into the free-running configuration. In a twin-ring embodiment two guide rings are attached to a different clamping arm. In a split-ring embodiment, a single guide ring is divided into two halves. Each half is attached to a different one of the clamping arms and forms a respective, separate closed loop. The loops formed by the guide ring halves extend through one another to form a closed ring. In a spring-ring embodiment, each end of a single guide ring is attached to a respective one of the clamping arms, and the guide ring is also the spring member. Except for the ring, the spring-ring embodiment can be formed as a single, injection-molded unit.

20 Claims, 7 Drawing Sheets

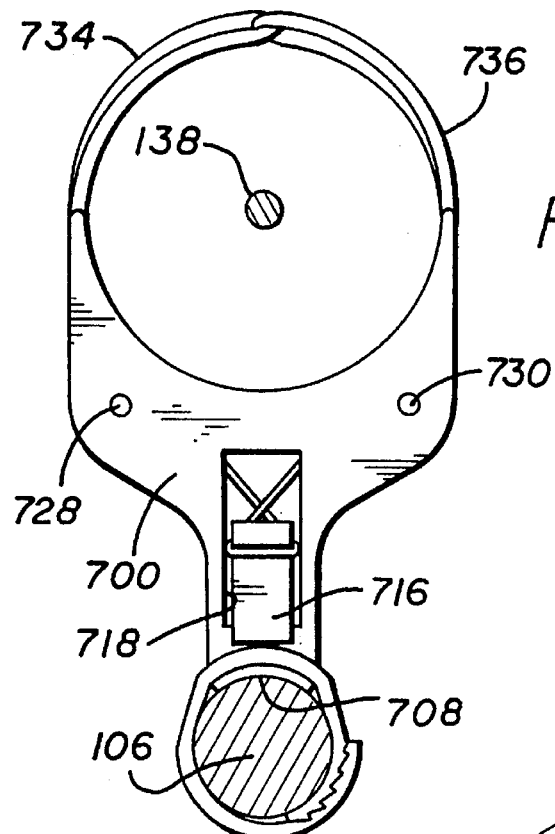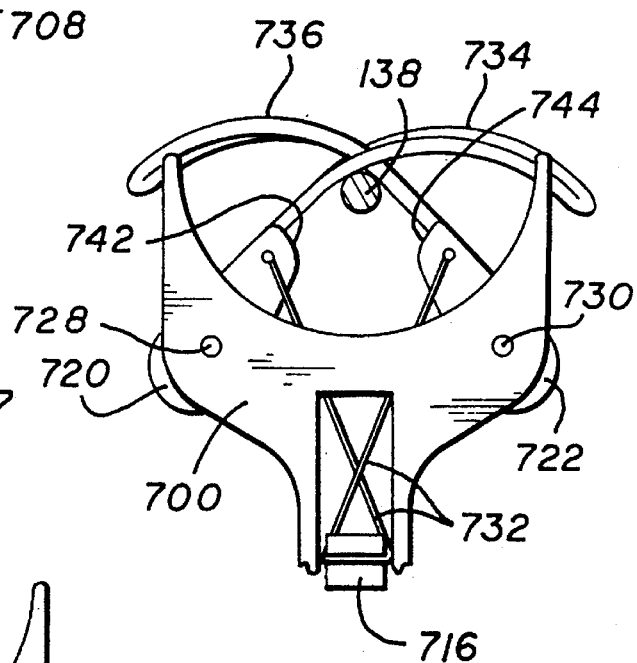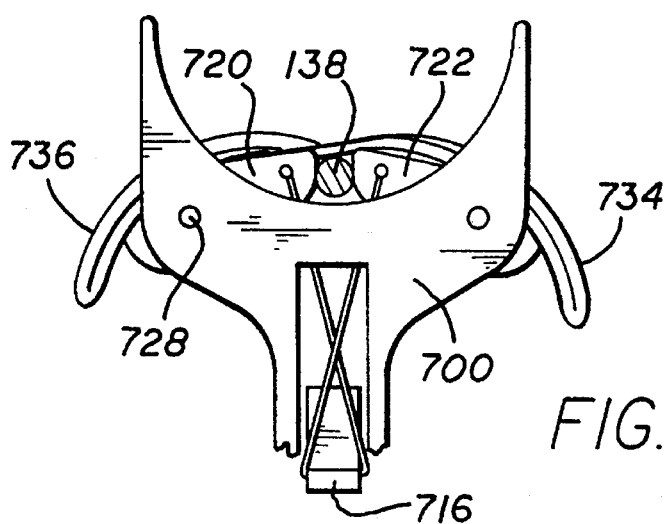

ACTIVE FISHING LINE BRAKE

BACKGROUND OF THE INVENTION

1. Field of the Invention

This invention involves fishing equipment in general and, in particular, an arrangement for braking and locking a fishing line.

2. Background Art

Fisherman often face the problem of slowing or stopping the feeding out of fishing line. Quick and sure control of line feed makes-possible better placement of the lure, bait or fly, and it also helps prevent tangling of the line.

There are, accordingly, several known fishing line brakes, most of which involve some moving, often hinged or sliding, actuating tab that is connected by an intermediate linkage to a clamping device that is mounted on the rod at a distance from the actuating tab.

In many types of fishing reels, the line is wound about a spool whose central axis is generally parallel to the rod, which defines the initial direction of travel of the line as it is fed from the reel. As the line runs quickly off of the spool, it may tend to whip outward away from or into the rod. This not only increases the risk of tangling, but it also prevents the line from feeding smoothly and efficiently to and through the clamping device of a line brake.

The ability to lock the fishing line is also helpful, however, for fly-fisherman, who typically use reels in which the line is wound on a spool whose axis is mainly perpendicular to the rod. Often, fly-fisherman pull out more line than they need for a particular cast and let the excess lie on the ground. The ability to lock and quickly unlock the line then allows the fisherman to let out as much line as he wishes but to only cast and fish with the "unlocked" portion of the line. This also allows the fisherman to cast with only one hand, since he does not need to hold the excess line with his non-casting hand.

One shortcoming of many known fishing line brakes is that they do not allow the fishing line to run freely from the spool and through the guide rings of the rod even when no braking of the line is desired. This problem often arises because the brake deflects the line away from its normal direction Of free travel so that it can pass through the brake. In, other words, many known line brakes create friction on the line even when the brake is in the free-running position.

U.S. Pat. No. 5,207,015 (Kvarnström, 4 May 1993) describes a line-braking arrangement that has an actuating tab or plunger that is connected by a linking rod or cable to a clamping device, which includes a clamping member and a separate clamping surface. In a non-blocking position, the fishing line runs freely through the clamping member. When the user presses the actuating member, the clamping member pivots down and locks the line by pressing it against the clamping surface. In order to control Whipping of the line as it runs off of the spool, intermediate rod rings are mounted on the rod between the freel and the clamping device. Although this known arrangement reduces or eliminates the problems of line whipping and friction-creating deflection, it is needlessly complicated in that it requires separated actuating members and clamping devices, a linking rod or cable between the actuator and clamp, and additional, separate, intermediate rod rings.

What is needed is a fishing line-locking arrangement that allows the line to run freely in the non-blocking position, that reduces line-whipping if the reel is such that it suffers from this problem, that securely locks the line in a blocking position, that is easy to manufacture and operate, and that can be mounted easily and quickly as a single unit on the fishing rod.

SUMMARY OF THE INVENTION

A fishing line brake is mounted on a longitudinally extending fishing rod. A reel is also mounted on the rod and holds fishing line. A line-braking device is mounted as a single unit on the rod and includes a main body and a pair of clamping arms that are rotatable relative to the main body about an axis that extends substantially in the longitudinal direction. At least one guide ring is securely attached to at least one of the clamping arms.

An actuation arrangement is provided for rotating the clamping arms and thereby for switching the line-braking device between a free-running and a locking configuration. In the free-running configuration, the clamping arms are separated and the fishing line extends without contact through each guide ring. In the locking configuration, the fishing line is clamped between the clamping arms. At least one spring member biases the clamping arms into the free-running configuration.

In certain embodiments of the invention, an opening extends through the main body in the longitudinal direction. The actuation arrangment includes a tab lever that extends through the opening in the main body and pivots about a pivot axis. A connector such as a wire connects the tab lever to the clamping arms. The clamping arms are pivotably attached to the main body.

In a twin-ring embodiment of the invention, there are two guide rings in the line-braking device. These rings are spaced apart in the longitudinal direction, and are substantially concentric when the line-braking device is in the free-running configuration. Each guide ring is securely attached to a different one of the clamping arms and each end of the spring member is securely attached to a respective one of the clamping arms.

In a split-ring embodiment of the invention, there is a single guide ring, which is divided into two guide ring halves. Each guide ring half is securely attached to a different one of the clamping arms and forms a respective, separate closed loop. The loops formed by the guide ring halves extend through one another and thereby form a closed ring. Two spring members are included, each a torsional spring pivot in the main body for each clamping arm.

In a spring-ring embodiment of the invention, there is a single guide ring, each end of which is securely attached to a respective one of the clamping arms. The guide ring itself is also the spring member. The clamping arms are rotatably attached to each other along inner, lower edges by a central hinge portion. The actuation arrangement comprises tab portions, one of which extends from a lower front edge of each clamping arm. Lower, inner edges of two side wall pieces are rotatably joined to respective sides of the main body, and a lower, outer edge of each clamping arm is rotatably attached to an upper, inner edge of a respective one of the side wall pieces. The main body, the clamping arms, the tab portions, and the side wall pieces of the spring-ring embodiment can be formed as a single, injection-molded unit.

All embodiments of the invention may alternatively be mounted on the reel itself, preferably by using an extension member or yoke that extends forward from the reel body, or by mounting the line brake on an extended mounting foot or shoe of the reel.

BRIEF DESCRIPTION OF THE DRAWINGS

FIG. 6 is a front view of a split-ring embodiment of the line-braking device according to the invention in a fully free-running configuration.

FIG. 7 is a rear view of the split-ring embodiment in an intermediate position.

FIG. 8 is a front view of the split-ring embodiment in its looking or one-braking configuration.

DETAILED DESCRIPTION

Figure 1:
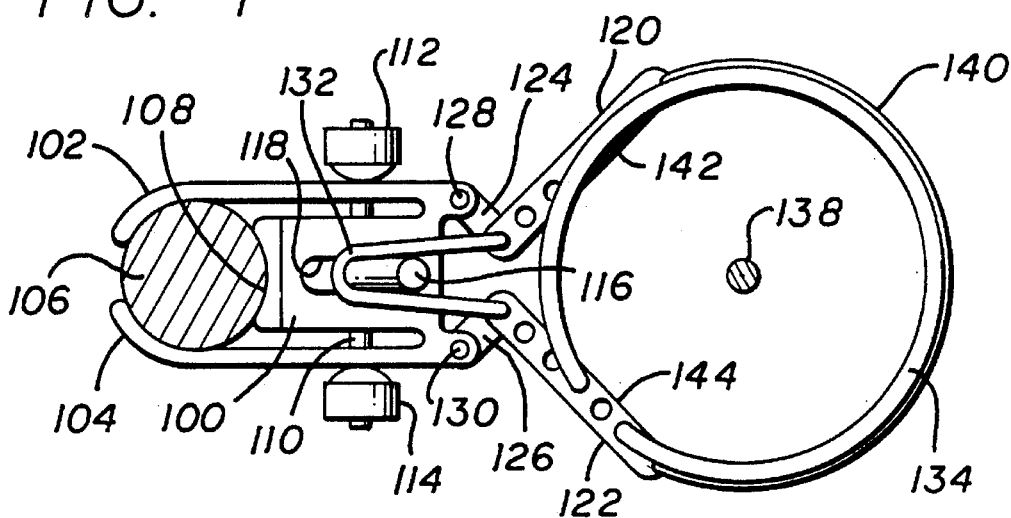
FIG. 1 is a front view Of a twin-ring embodiment of the invention in its free-running configuration and mounted on a fishing rod that has a relatively small diameter.

FIG. 1 is a front view of a twin-ring embodiment of the invention in its free-running configuration. By "front" is meant the view of the device from the holding end of a fishing rod, that is, the end that the fisherman holds and on which a reel is attached. The "rear" view is thus the view from the tip of the rod. The invention may be used with any type of reel and is especially advantageous with tackle that has reels such as a spinning reel or a fly-fishing reel in which the fishing line may have a tendency to "whip" outward from the rod during a cast or may be pulled off the reel by hand before one or more casts.

The line brake and lock in the twin-ring embodiment of the invention includes a main body 100 that is preferably made of any rugged, water resistant and at least partially resilient material such as a highly impact-resistant plastic (which can be injection molded), or of metals such as aluminum and stainless steel, which can be cut or stamped, with portions bent upward to form the various walls of the main body.

Mounting arms 102, 104 extend from the main body 100 toward and at least partially around a rod 106 (shown in cross section) on either side. A conventional fishing rod has several permanently mounted guide rings along its length; the line brake according to the invention is mounted on the rod between the reel and the permanently mounted guide rings that is closest to the reel (see below).

The main body 100 also has a stabilizing member or portion 108 that bears against, the surface of the rod 106. The stabilizing member or portion is preferably in the form of a tab that extends in the longitudinal direction and forms a contact surface between the main body 100 and the rod 106. Since modern rods are often made of materials such as glass or carbon fiber-reinforced plastics that do not stand up well to impact or scratching, the tab 108 is preferably made of a material such as plastic that does not scratch the rod. The contact surface of the tab 108 is preferably cylindrically concave and curved to at least approximately match the outer surface of the rod where the invention is to be mounted. This lessens the point stress on the rod by providing a greater contact surface, which also gives more secure friction mounting of the invention on the rod.

The tab 108 may be a portion of the main body or a separate member but it preferably extends farther in the longitudinal direction than the main body itself in order to provide greater support and to prevent the line-braking device from "leaning" toward the user when he actuates the device. This actuation is described below.

A pin 110 extends through each arm 102 and through the main body 100 preferably perpendicular to the longitudinal direction defined by the rod 106. (In FIG. 1, the longitudinal direction is into the plane of the figure.) At least one and preferably both ends of the pin are threaded and on each threaded end is a knob 112, 114, bolt, wing nut, or the like, that is screwed onto and can be tightened down on the pin. As the knobs 112, 114 are screwed and tightened down, the mounting arms 102, 104 are squeezed together to clamp the rod 106 and hold the entire line-braking device securely on the rod.

Other mounting arrangements may be used to hold the line-braking invention on the rod. For example, instead of arms extending along the main body 100, a single strap could extend as a band around the rod 106 and through the main body 100, with one end of the band fixed, and with slots in the other end engaged by a worm gear. Like a hose clamp, the band would constrict about the rod as the worm gear is turned. One advantage of the illustrated mounting arrangement, however, is that it allows the invention to be mounted quickly on rods of different diameters yet. still be easily removable. The invention may also be permanently mounted on the rod at the time of manufacture, in which case there will be no need to provide a user-adjustable clamping arrangement for mounting.

The pin 110 also serves as an axle to which an inner end of a finger tab or lever 116 is attached. The finger tab extends from the pin 110, through a groove-like opening 118 in the main body 100, and outward mainly parallel to the longitudinal direction, toward the holding end of the rod. In the illustrated embodiment, the finger tab 116 is rigid but is bent slightly outward away from the rod 106 so as to be more comfortable for the user when he pushes the tab toward the rod (see below); this is not necessary, and the tab can also have a plastic or other soft covering to make it even more comfortable for the user to press a finger against. The tab 116 serves as a finger-operated actuator and moves within the opening 118 toward and away from the rod.

Two clamping arms 120, 122 are connected via links or link portions 124, 126 to the main body 100. To simplify construction, the links are preferably integral portions of the clamping arms 120, 122, but they may also be separate members. The links 124, 126 are connected to the main body 100 via pins 128, 130, so that the links, and therefore also the clamping arms 122, 124, are able to pivot in the plane of FIG. 1, that is, perpendicular to the longitudinal direction defined by the rod.

A loop of stiff wire 132 extends from the intersection between the clamping arm 120 and its link 124, toward the rod 106, around the tab 116, and to the intersection between the clamping arm 122 and its link 126. In the case in which the links 124, 126 are members separate from the arms 120, 122, the ends of the wire loop 132 may extend through the arms and links to connect each arm/link pair and to act as an additional pivot bearing for each pair.

A front guide ring 134 is attached securely to one of the clamping arms 122 and a rear guide ring 136 (see FIGS. 2 and 3) is securely attached to the other of the clamping arms 120. For ease of manufacture and assembly, the guide rings 134, 136 in the illustrated embodiment are mounted by being split, with their ends then forced into holes made in the respective clamping arm; they may, however, be solid rings securely attached in any conventional manner to the respective clamping arm. The guide rings and arms should, in any case, form closed curves so that the fishing line cannot escape from the line-brake.

The guide rings 134, 136 are preferably made of any stiff, corrosion-resistant wire such as stainless steel. In the free-running configuration shown in FIG. 1, the guide rings are concentric, sa that fishing line can run freely through them.

Each end of a spring 140 is attached securely to outer ends of each clamping arm (the ends farthest from the links 124, 126). The spring is preferably a flat spring bent to form a section of a cylinder roughly concentric with and with about the same radius and curvature as the guide rings 134, 136. A wire spring may also be used, however, provided it is sufficiently anchored in the clamping arms not to rotate forward and back and potentially interfere with the guide rings. In the free-running configuration shown in FIG. 1, the spring 140 forces the clamping arms 120, 122, apart, but preferably only weakly. In other words, the free-running configuration should be the normal "resting" configuration of the line brake, that is, the position into which the spring biases the clamping arms 120, 122 and, via these arms, the tab 116.

Figure 2:
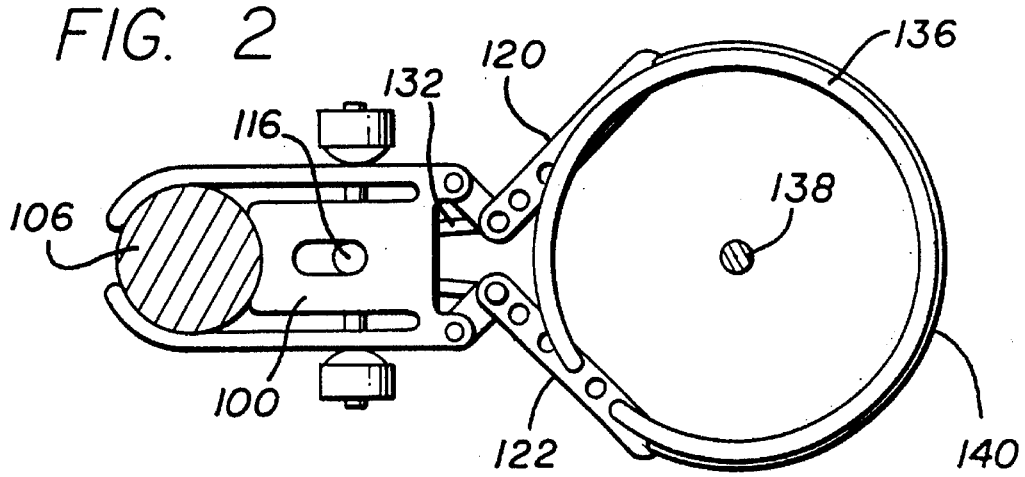
FIGS. 2 and 3 show a rear view and side view, respectively, of the twin-ring embodiment in the free-running configuration.

FIG. 2, which is a rear view of the line-braking device shown in FIG. 1, shows the attachment of the rear ring 136 to the one clamping arm 122.

Figure 3:
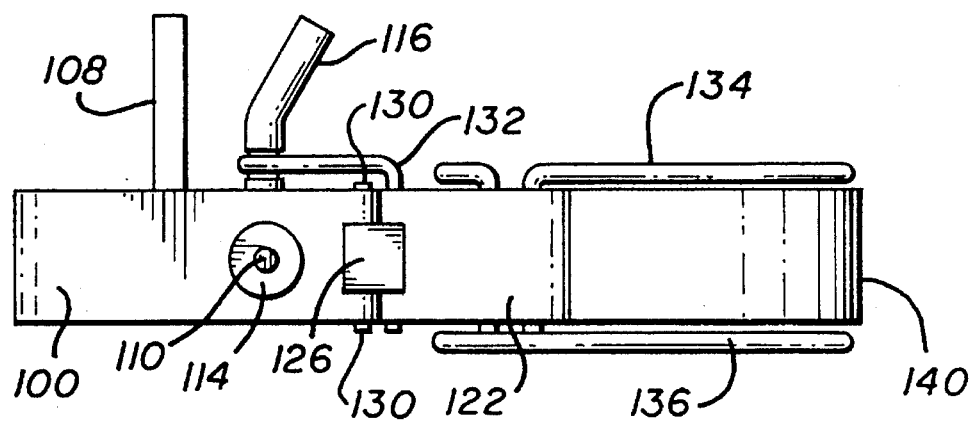
Figure 4:
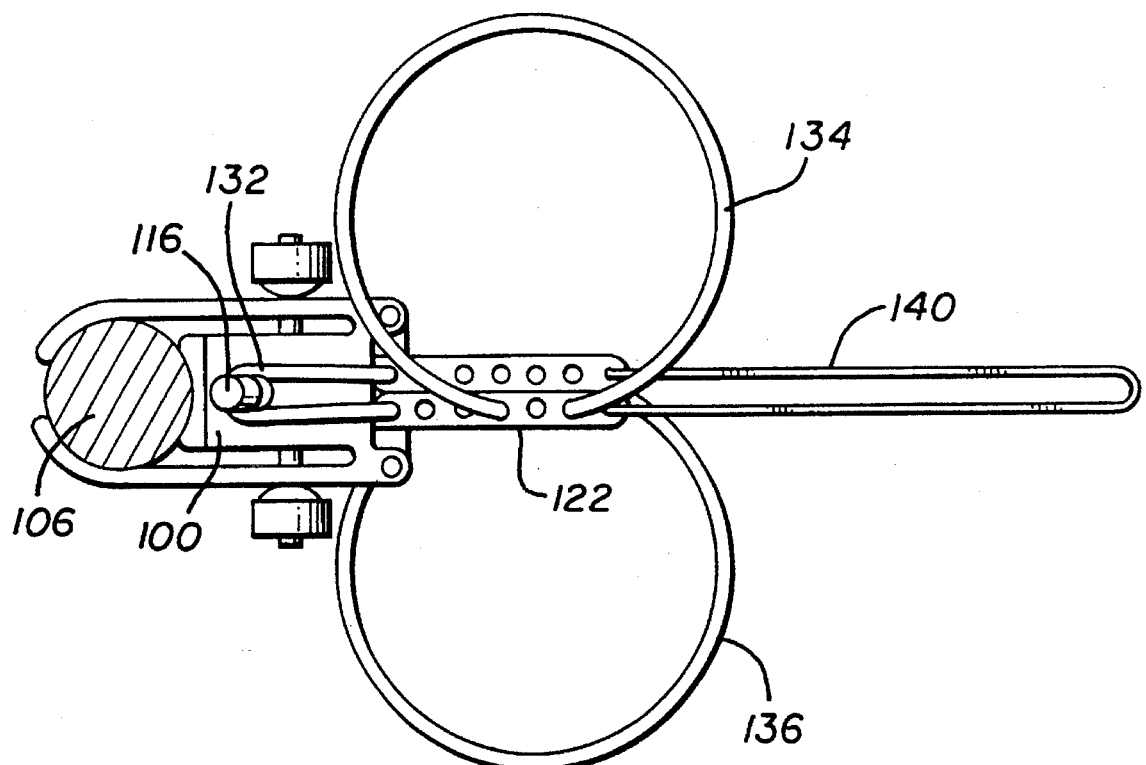
FIG. 4 illustrates the twin-ring embodiment in its locking or line-braking configuration.

FIG. 3 is a side view of the line-braking device shown in FIG. 1. Note that the actuating tab 116 preferably at least lightly contacts the wire loop 132 in the free-running configuration. This eliminates undesirable play in the device.

Consider now FIG. 1 once again. In order to brake or lock the fishing line, the user places a finger or thumb on the actuating lever or tab 116 and presses it toward the rod 106. This then also tensions the wire loop 132, which in turn pulls the clamping arms 120, 122, where they connect to the links 124, 126, toward the rod. The clamping arms thereby rotate toward each other about their respective pivots 128, 130. The distance between the pivots 128, 130 is chosen together with the width of the clamping arms so that, if there were no fishing line 138 threaded through the guide rings 134, 136, the arms would contact each other flush over their entire length when the tab 116 is pressed as far toward the rod as possible within the opening 118.

Figure 5:
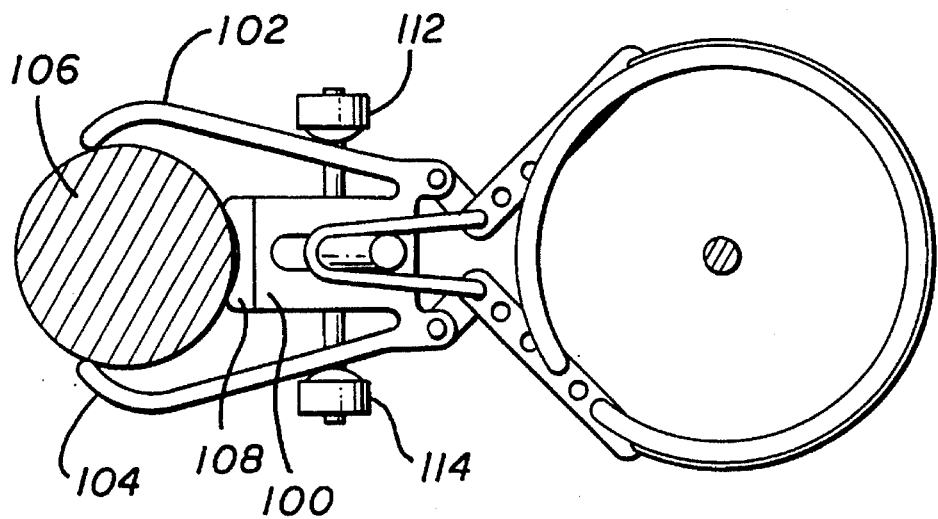
FIG. 5 shows the twin-ring embodiment mounted on a fishing rod with a relatively large diameter.

The device is then in the locking configuration, which is illustrated in FIG. 5. As FIG. 5 shows, in the locking configuration, the guide rings 134, 136 extend to either side of the device and the spring 140 is forced out of its resting state and outward from the rod. Although not shown in FIG. 5, the fishing line 138 is thereby clamped between the arms 134, 136 when the device is in the locking configuration.

Inner clamping or braking surfaces 142, 144 of the clamping arms 134, 136 face each other in the locking configuration and may be provided with a high-friction but preferably non-abrasive coating, surface, or layer of material to increase the holding force that is applied to the fishing line when it is clamped between the arms. These clamping or braking surfaces may also have mating contours, such as tongues-and-grooves, to increase the mechanical holding power of the device by causing the fishing line to deflect between the arms, but only when clamped.

When the user releases the tab 116, the spring 140 will force the clamping arms apart until the device once again is in the free-running configuration shown in FIG. 1.

FIG. 5 illustrates the way in which the device may be mounted on a larger diameter rod 106. In such case, the rod is laid against the stabilizing tab 108. The mounting arms 102, 104 then bend outward from the main body 100 so that they reach around the widest part of the rod cross-section, that is, past the centerline of the rod. The knobs 112, 114 are then tightened down as before.

FIGS. 6–10 illustrate a split-ring embodiment of the line-braking device according to the invention. This embodiment also has a main body 700, which may be mounted on the rod 106 using the same arrangement of mounting arms and tightening knobs described above, but is shown with an alternative mounting arrangement that uses a mounting foot 702 and a toothed strap of non- or low-stretch plastic. The ends of the strap preferably have mating, angled teeth to provide secure attachment, but other fastening arrangements such as hook-and-loop material (Velcro®) may also be used as long as they provide enough friction against the rod. The user draws the strap tightly around the rod so that the teeth mesh and lock, until the user pulls the strap ends apart again. The main body 700 has a contact portion or surface 708 that bears against the rod when mounted and that also is held against the rod by the strap.

An actuating lever or tab 716 moves within an opening 718 as in the twin-ring embodiment described above. A wire loop 732 extends from the tab 716, and preferably around it, to provide the greatest holding power with the least complicated attachment. Each end of the wire loop 732 is securely attached to tips of respective clamping cam arms 7!20, 722 (see FIG. 7), which rotate toward and away from each other about pivots 728, 730.

The wire loop 732 is preferably also a wire spring, which is wound around the table 716 and biases the cam arms 720, 722 away from each other, into the free-running configuration. In this way, both the biasing spring and the connector between the tab and the clamping arms can be formed of a single element. Alternatively, the pivots 728, 730 may be made as torsional springs that bias the ring halves 734, 736 into the free-running configuration shown in FIG. 7. As yet another alternative, a separate spring could be attached to and tensioned between the lower portions of the clamping arms; as the arms rotate into the locking position (described below), the spring would be stretched and would bias the arms back into the free-running configuration.

In the split-ring embodiment of the invention, a single guide "ring" is formed of two interlocking wire ring halves, each of which is in the form of a wire ring loop. One end of each ring half is secured in a front side of one of the cam arms, arcs inward roughly as a semicircle, passes between the other wire ring loop, and then bends back on and parallels itself back along the same arc and has its other end secured in the rear side of the same cam arm. The tips of the ring halves are preferably twisted slightly in opposite directions relative to one another. This allows them to "mesh" freely without jamming even in the free-running configuration, when the tips are touching or nearly so.

FIG. 7 shows the split-ring embodiment in an intermediate position, in which the user has pressed the tab 716 part-way toward the rod. The cam arms 720, 722 are thereby forced to rotate toward each other via the wire loop 732. Notice that the fishing line 138 remains captive between the ring halves 734, 736, and will be pressed toward the rod and toward friction or braking surfaces 742,744 of the cam arms, as the cam arms and the ring halves rotate.

FIG. 8 shows the split-ring embodiment in its locking configuration, with the tab 716 pressed fully toward the rod and with the fishing line securely pinched between the friction Surfaces 742, 744 (see FIG. 7) of the cam arms 720, 722. To increase holding power on the fishing line, the friction surfaces need not be (and preferably are not) simply flat pinching surfaces; for example, the surfaces may be angled (but still substantially flush when together) or have mating grooves and ridges, not only to increase the clamping surface area, but also to cause a slight deflection of the line. When the user releases the tab 716, however, the spring wire loop 732 (or torsional spring pivots 728, 730) forces the cam arms, and thus also the ring halves, back into the free-running configuration shown in FIG. 6.

Figure 9:
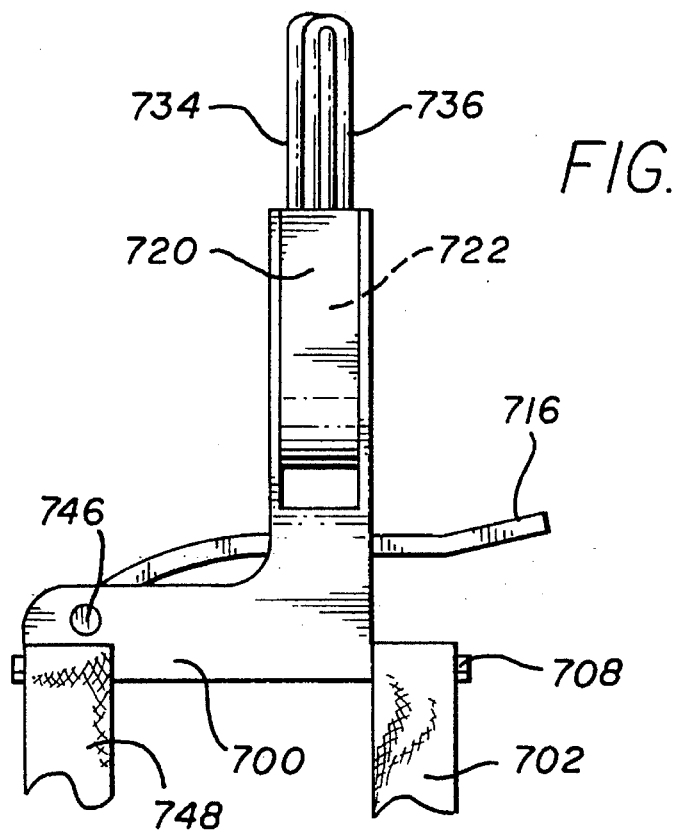
FIG. 9 is a side view of the split-ring embodiment.

FIG. 9 is a side view Of the split-ring embodiment shown in FIGS. 6–8. Note that the ring halves are slightly offset in the longitudinal direction so that they can rotate, with one branch of each passing between both branches of the other. The tab 716 rotates about a pivot shaft 746 that is anchored in a rear portion of the main body 700. The rear portion is held firmly against the rod with a rear clamping arrangement 748 such as another toothed or hook-and-loop strap, which fits around or into a groove, tab or other rearward-extending portion of the main body similar to the forward-extending contact portion or surface 708. As long as there is enough throw, up and down, to allow the tab arm to move the clamping arms fully into the locking configuration, the rear portion in which the tab arm is pivoted need not be as far from the rest of the main body as is illustrated in FIG. 9.

Figure 10:
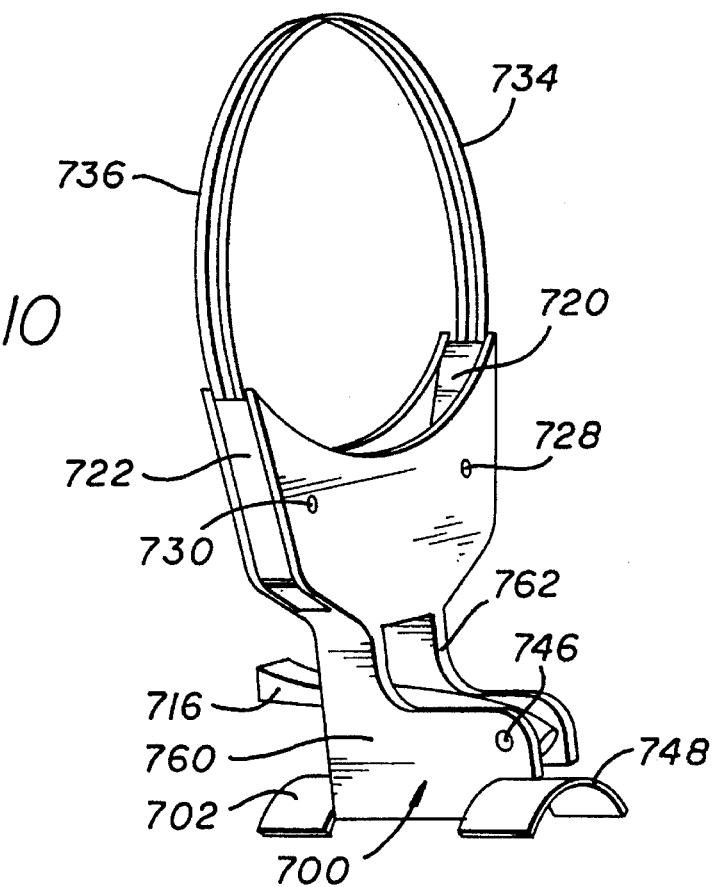
FIG. 10 is a perspective view of the split-ring embodiment from a lower, rear position.

The main body of the split-ring embodiment is particularly well-suited to be made of stamped or cut metal, such as aluminum, which provides both ease of manufacture (and low cost) and great strength. The contact portion 708 and the rear portion, which form the mounting "feet" for the main body, would thereby be forward and rearward-extending "flaps" that would be rounded to conform to the surface of the rod. Side portions, extending substantially perpendicular to the mounting feet, would then be bent upward (away from the rod) to form two side walls of the main body. The tab arm pivot could then be mounted between the two side walls. Other portions of the stamped or cut metal could be bent to form mounting walls for the other elements, such as the cam arms. FIG. 10 is a perspective view of the split-ring embodiment from a lower, rear position, which shows side walls 760, 762 and mounting feet 702, 748, which can be easily formed of bent, stamped aluminum or other metal.

FIGS. 11–14 illustrated a spring-ring embodiment of the invention, which eliminates the need for pivot shafts, actuating wire loops, clamping arms, springs and actuating tabs that must be mounted as separate elements into or onto the main body of the line brake. In fact, other than a guide ring (and possibly also the chosen mounting structure, such as the one illustrated), the spring-ring embodiment of the line brake can be manufactured as a single piece of injection-molded plastic.

The spring-ring embodiment includes a main body 900, which, in the illustrated embodiment, is mounted to the rod 106 using a pair of stiff wire or rod yokes 902 and 948 (see FIG. 12) whose ends are secured in holes in the main body and which extend tightly around the rod. The holes 970, which are more clearly visible in FIG. 13, allow for adjustment of the line brake for mounting onto rods of different diameters. Other mounting arrangements, such as those described above in connection with the other illustrated embodiments of the invention, may also be used to mount the spring-ring embodiment.

Various portions of the spring-ring embodiment are joined at their edges by a thin strip of the material from which the portions themselves are molded. This edge strip forms a hinge that allows relative rotation of the portions. These strips or molded-together edges are referred to below as "hinges" or "hinge portions".

The hinges are preferably formed during the same injection molding process as for the rest of the device and can be formed simply by having a thick enough connecting portion in the mold and then not separating the portions after molding. This procedure for forming hinged edges is well known in the field of injection molding.

The plastic used to injection-mold the invention may be any known plastic, such as many thermoplastics and fiber-reinforced plastics, that is rigid and sturdy enough to mount securely on a fishing rod, hold the mounting yokes 902,948 (or other mounting elements), and brake and clamp the fishing line. It should, however, be soft enough to allow the hinge portions to flex hundreds or thousands of times without cracking and breaking due to exhaustion. The choice of material and the thickness of the hinge portions may be determined in any conventional manner based on knowledge of the mechanical properties of the chosen plastic or through simple experimentation.

Other arrangements such as mating snap-in fingers or separate hinge pins may be used to join and hinge the various parts of the spring-ring embodiment. The preferred method of injection molding the hinge portions integral with the portions they join has the advantage, however, of eliminating the needs both for separate elements and for separate assembly steps. This in turn reduces manufacturing complexity and cost.

Lower, inner edges of side wall pieces 950, 952 are joined to the main body 900 on either side by hinge portions 954, 956, respectively. The side pieces can thereby pivot outward away from the main body.

Lower, outer edges of clamping arms 920, 922 are joined to upper, inner edges of the side wall pieces 950, 952 by means of hinge portions 958, 960, respectively. The clamping arms 920, 922 are also joined to each other along their common, lower, inner edge by another hinge portion 962. As in the other described embodiments, each clamping arm 920, 922 has a respective clamping surface 942, 944.

All of the hinge portions 954, 956, 958, 960, and 962 run substantially parallel to the longitudinal axis of the fishing rod. The various hinged portions can thereby rotate about axes that also extend in the longitudinal direction.

A guide ring 934 is formed of a single loop of resilient wire. Each end of the guide ring 934 is secured near the tip of a respective one of the clamping arms 920, 922; for ease of assembly the ends are preferably friction-fitted into holes in the arms. Because the guide wire is resilient, it also acts as a torsional ring spring. The guide wire is substantially unstressed in (and therefore biases the clamping arms into) the free-running "V" configuration shown in FIG. 11.

Figure 11:
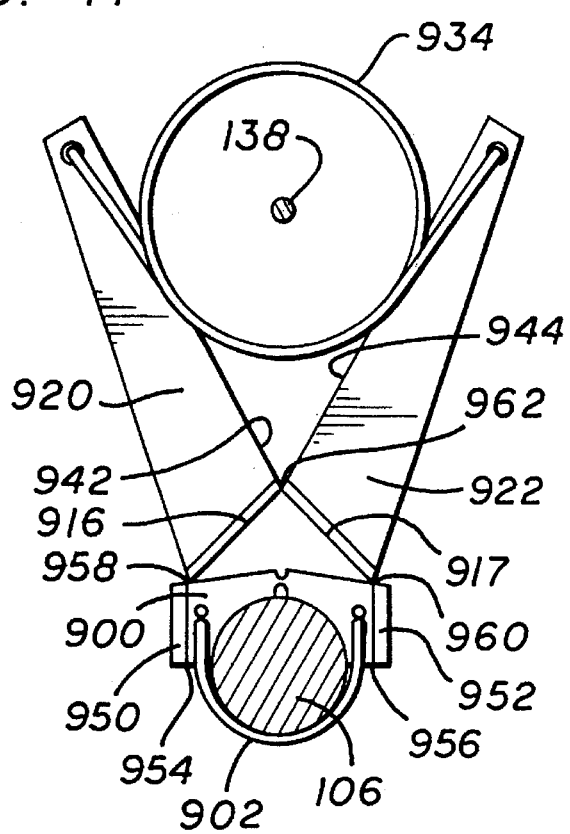
FIGS. 11 and 12 show, respectively, a front view and a side view of a spring-ring embodiment of the line-braking device according to the invention in a fully free-running configuration.

A mainly planar tab portion 916, 917 extends substantially perpendicular to and along the lower edge of each clamping arm 920, 922 in the longitudinal direction toward the reel (not shown in FIG. 11). The tab portions 916, 917 are also joined to each other by the hinge portion 962, and are joined to a respective one of the side wall pieces 950, 952, by the hinge portions 958, 960. The attachment between the tab portions 916, 917 and the respective clamping arm 920, 922 is, however, not hinged, but is as rigid as the injection-molded plastic allows.

When viewing FIG. 11, one should keep in mind that the generally triangular region between the tab portions 916, 917, and the upper surface (opposite the rod 106) of the main body 900 is open, or at least does not have anything that would interfere with the movement of the clamping arms.

Figure 12:
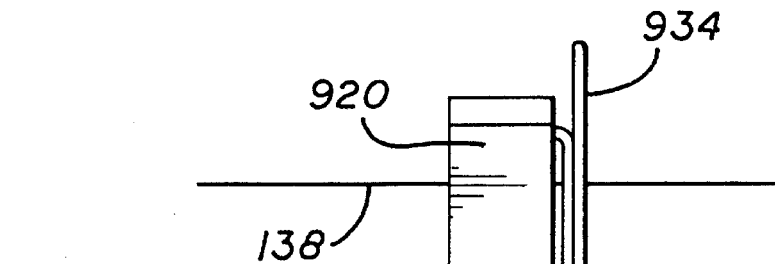

FIG. 12 illustrates the spring-ring embodiment from the side. Note that the tab portions (only the one numbered 916 is visible in FIG. 12), together with the clamping arms 920, 922 (only arm 920 is visible), extend as far in the longitudinal direction as the main body 900. This is not absolutely necessary, but it simplifies the injection mold.

Assume now that the user presses either or both of the tab portions 916, 917 toward the main body 900, that is, toward the rod 106. The clamping arms 920, 922 will begin to rotate toward each other about the hinges 958, 960 and against the biasing force of the spring guide ring 934. The tab portions will also transfer a lateral force to the side wall pieces 950, 952, via the hinges 958, 960. This lateral force will cause the side portions to rotate about their respective hinge portions 954, 956, away from the main body.

Figure 13:
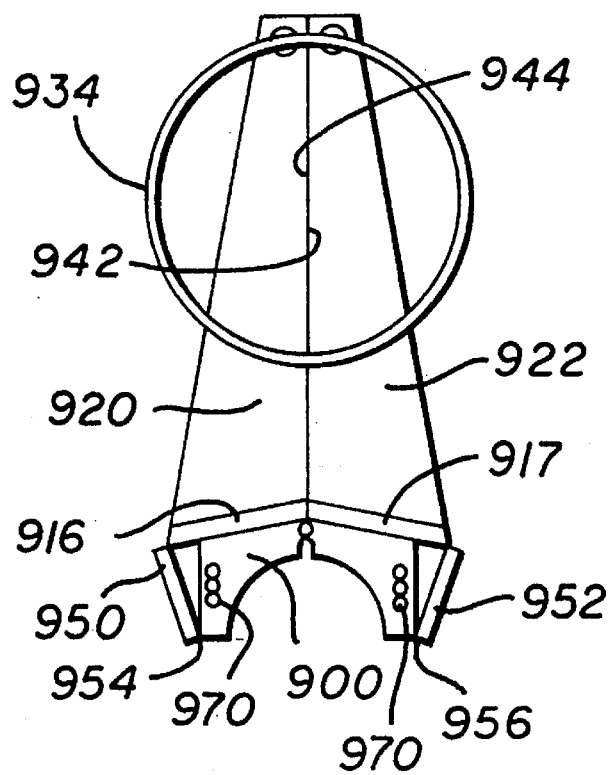
FIGS. 13 and 14 show, respectively, a front view and a side view of the spring-ring embodiment in its locking or line-braking configuration.
Figure 14:
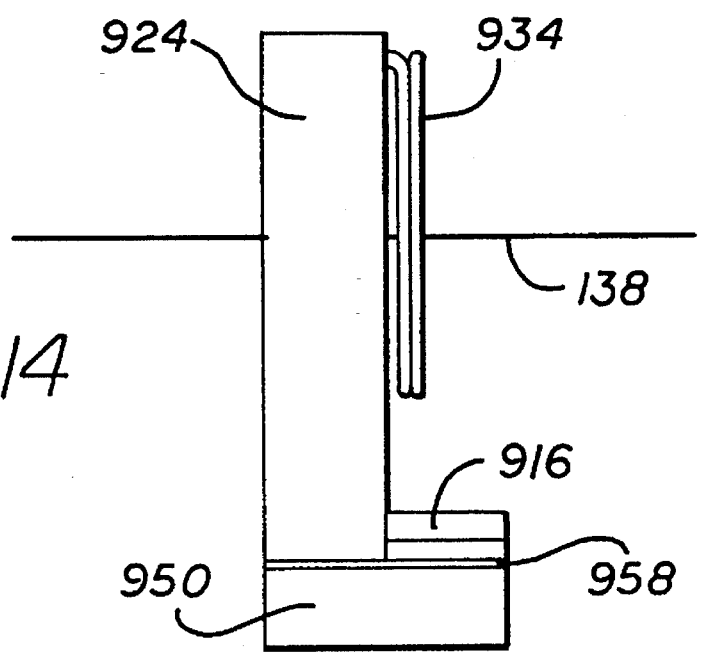

When the tab portions 916, 917 have been pressed toward the rod so far that they lie against the upper surface of the main body, the spring-ring embodiment will assume the line-locking or braking configuration shown in FIGS. 13 and 14. (These figures show the invention removed from the rod for the sake of simplicity, and also to better show the plurality of adjustment holes 970 into which the ends of the mounting yokes fit.)

In the line-locking configuration, the clamping surfaces 942, 944 of the clamping arms 920, 922 lie mostly flush against each other, clamping the fishing line between them. When the user stops pressing the tab portions 916, 917, the clamping arms rotate back to the free-running configuration shown in FIGS. 11 and 12 under the returning force of the spring guide wire 934.

Figure 15:
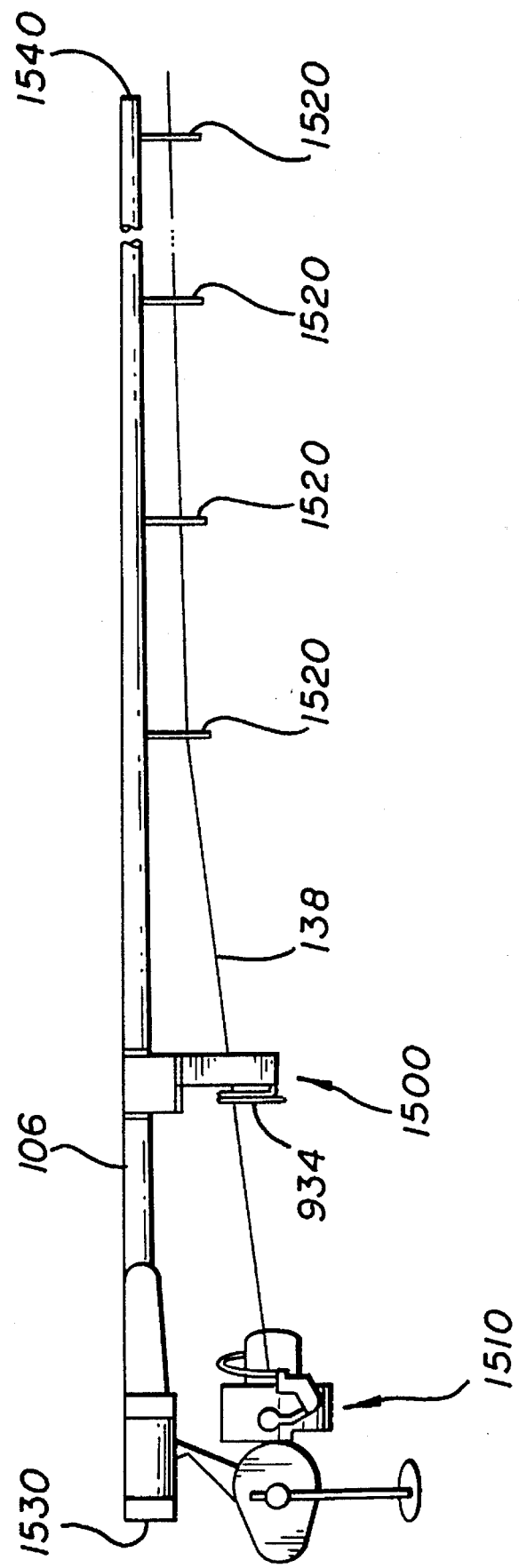
FIG. 15 shows the spring-ring embodiment mounted on a conventional fishing rod along with a spinning reel.

FIGS. 1–14 show the various embodiments of the invention extending "upward". This is not necessary. To ensure that the line can run freely when desired, the invention should be mounted on the fishing rod so that the guide ring(s) of the invention are roughly in line with the other fixed guide rings that are normally mounted over the length of the rod. Most fly and spinning reels, for example, hang down from the rod, as do the guide rings installed on the rod. On such equipment, the invention is mounted so that the clamping arms and guide ring(s) extend downward, and, as before, the user actuates the tabs 116, 716, 916, 917 by pressing them toward the rod. FIG. 15 illustrates such a configuration.

FIG. 15 shows the spring-ring embodiment of the invention, indicated generally by the reference number 1500, and a common spinning reel 1510 (shown by way of example only), mounted at the holding end 1530 of the fishing rod 106. Several conventional fixed guide rings 1520 are also mounted on the rod. In FIG. 15, the line-braking device 1500 is shown in the free-running configuration, so that the line 138 is free to pay off the reel 1510, through the spring guide ring 934, through the fixed guide rings 1520, off the tip 1540 of the rod, and on toward the hopefully hungry fish beyond.

The invention (all embodiments) should be mounted on the rod close enough to any grip and to the reel that the user can comfortably and easily reach the actuating tabs or tab portions of the line brake while holding the rod securely and naturally. Note that all embodiments of the invention are mounted as single units onto the rod, and there is no need for separate, spaced-apart mounting of actuators and clamps. Mounting the invention between the reel and the innermost fixed guide ring also reduces or eliminates whipping of the line as it pays off the reel or is taken up from a length that has been pulled off the reel before a cast.

The various embodiments of the invention may also be mounted directly on some portion of the reel itself, or on an rod or yoke that extends forward from the body of the reel. For example, the main body of the various illustrated line brakes may be mounted directly (even by welding) onto the forward-extending mounting shoe of the reel, which is commonly locked under a sleeve on the rod. In this case, the reel and line brake may be delivered to a user as a single, convenient device.

I claim:

1. An arrangement for fishing comprising:
   a rod that extends in a longitudinal direction and has a holding end and a tip;
   a reel that holds fishing line and is mounted on the rod at the holding end;
   a line-braking device that is mounted as a single unit on the rod and comprises:
   a main body;
   a pair of clamping arms that are rotatable relative to the main body about an axis that extends substantially in the longitudinal direction;
   at least one guide ring that is securely attached to at least one of the clamping arms;
   actuating means for rotating the clamping arms and thereby for switching the line-braking device between a free-running configuration, wherein the clamping arms are separated and the fishing line extends without contact through each guide ring, and a locking configuration, wherein the fishing line is clamped between the clamping arms; and
   spring means for biasing the clamping arms into the free-running configuration.

2. An arrangement as in claim 1, wherein:
   an opening extends through the main body in the longitudinal direction; and
   the actuating means comprises:
   a tab lever that extends through the opening in the main body and pivots about a pivot axis; and
   an actuation connector connecting the tab lever to the clamping arms; and
   the clamping arms are pivotably attached to the main body.

3. An arrangement as in claim 2, wherein:
   the guide rings are two in number, are spaced apart in the longitudinal direction, and are substantially concentric when the line-braking device is in the free-running configuration;
   each guide ring is securely attached to a different one of the clamping arms;
   the spring means is a spring with two spring ends, each spring end being securely attached to a respective one of the clamping arms.

4. An arrangement as in claim 2, wherein:

there is a single guide ring divided into two guide ring halves;

each guide ring half is securely attached to a different one of the clamping arms and forms a respective, separate closed loop; and the loops formed by the guide ring halves extend through one another.

5. An arrangement as in claim 4, wherein the spring means and the actuation connector are both formed of a single wire spring, which extends from one of the clamping arms, around the tab lever, and to the other of the clamping arms.

6. An arrangement as in claim 4, wherein the spring means comprises a torsional spring pivot in the main body for each clamping arm.

7. An arrangement as in claim 1, wherein:

there is a single guide ring with two ring ends;

each ring end is securely attached to a respective one of the clamping arms; and the guide ring is also the spring means.

8. An arrangement as in claim 7, wherein:

the clamping arms are rotatably attached to each other along inner, lower edges by a central hinge portion;

the actuating means comprises tab portions, one of which extends from a lower front edge of each clamping arm;

lower, inner edges of two side wall pieces are rotatably joined to respective sides of the main body; and a lower, outer edge of each clamping arm is rotatably attached to an upper, inner edge of a respective one of the side wall pieces.

9. An arrangement as in claim 8, wherein the main body, the clamping arms, the tab portions, and the side wall pieces are a single, injection-molded unit.

10. A fishing line brake that is mountable on a longitudinally extending fishing rod, comprising:

a main body;

a pair of clamping arms that are rotatable relative to the main body about an axis that extends substantially in the longitudinal direction;

at least one guide ring that is securely attached to at least one of the clamping arms;

actuating means for rotating the clamping arms and thereby for switching the line-braking device between a free-running configuration, wherein the clamping arms are separated and the fishing line extends without contact through each guide ring, and a locking configuration, wherein the fishing line is clamped between the clamping arms; and spring means for biasing the clamping arms into the free-running configuration.

11. A fishing line brake as in claim 10, wherein:

an opening extends through the main body in the longitudinal direction; and the actuating means comprises:

a tab lever that extends through the opening in the main body and pivots about a pivot axis; and an actuation connector connecting the tab lever to the clamping arms; and the clamping arms are pivotably attached to the main body.

12. A fishing line brake as in claim 11, wherein:

the guide rings are two in number, are spaced apart in the longitudinal direction, and are substantially concentric when the line-braking device is in the free-running configuration;

each guide ring is securely attached to a different one of the clamping arms;

the spring means is a spring with two spring ends, each spring end being securely attached to a respective one of the clamping arms.

13. A fishing line brake as in claim 11, wherein:

there is a single guide ring divided into two guide ring halves;

each guide ring half is securely attached to a different one of the clamping arms and forms a respective, separate closed loop; and the loops formed by the guide ring halves extend through one another.

14. A fishing line brake as in claim 13, wherein the spring means and the actuation connector are both formed of a single wire spring, which extends from one of the clamping arms, around the tab lever, and to the other of the clamping arms.

15. A fishing line brake as in claim 14, wherein the spring means comprises a torsional spring pivot in the main body for each clamping arm.

16. A fishing line brake as in claim 10, wherein:

there is a single guide ring with two ring ends;

each ring end is securely attached to a respective one of the clamping arms; and the guide ring is also the spring means.

17. A fishing line brake as in claim 16, wherein:

the clamping arms are rotatably attached to each other along inner, lower edges by a central hinge portion;

the actuating means comprises tab portions, one of which extends from a lower front edge of each clamping arm;

lower, inner edges of two side wall pieces are rotatably joined to respective sides of the main body; and a lower, outer edge of each clamping arm is rotatably attached to an upper, inner edge of a respective one of the side wall pieces.

18. A fishing line brake as in claim 17, wherein the main body, the clamping arms, the tab portions, and the side wall pieces are a single, injection-molded unit.

19. A fishing line brake comprising:

a main body;

a pair of clamping arms that are rotatable relative to the main body about an axis that extends substantially in a longitudinal direction;

a guide ring that has two ring ends, each ring end being securely attached to a respective one of the clamping arms;

actuating means for rotating the clamping arms and thereby for switching the line-braking device between a free-running configuration, wherein the clamping arms are separated and the fishing line extends without contact through each guide ring, and a locking configuration, wherein the fishing line is clamped between the clamping arms; and spring means for biasing the clamping arms into the free-running configuration; wherein:

the guide ring is also the spring means;

the clamping arms are rotatably attached to each other along inner, lower edges by a central hinge portion;

the actuating means comprises tab portions, one of which extends from a lower front edge of each clamping arm;

lower, inner edges of two side wall pieces are rotatably joined to respective sides of the main body;

a lower, outer edge of each clamping arm is rotatably attached to an upper, inner edge of a respective one of the side wall pieces; and the main body, the clamping arms, the tab portions, and the side wall pieces are a single, injection-molded unit.

20. A fishing line brake comprising:

a main body;

a pair of clamping arms that are pivotably attached to the main body and are rotatable relative to the main body about an axis that extends substantially in a longitudinal direction;

at least one guide ring that is divided into two guide ring halves and that is securely attached to at least one of the clamping arms;

actuating means for rotating the clamping arms and thereby for switching the line-braking device between a free-running configuration, wherein the clamping arms are separated and the fishing line extends without contact through each guide ring, and a locking configuration, wherein the fishing line is clamped between the clamping arms; and spring means for biasing the clamping arms into the free-running configuration; wherein:

an opening extends through the main body in the longitudinal direction; and the actuating means comprises:

a tab lever that extends through the opening in the main body and pivots about a pivot axis; and an actuation connector connecting the tab lever to the clamping arms;

there is a single guide ring divided into two guide ring halves;

each guide ring half is securely attached to a different one of the clamping arms and forms a respective, separate closed loop;

the loops formed by the guide ring halves extend through one another; and the spring means and the actuation connector are both formed of a single wire spring, which extends from one of the clamping arms, around the tab lever, and to the other of the clamping arms.

* * * * *